United States Patent
Weiberle et al.

(10) Patent No.: US 8,006,547 B2
(45) Date of Patent: Aug. 30, 2011

(54) SENSOR FOR A TRANSMISSION-SHIFT CONTROL, IN PARTICULAR OF A MOTOR VEHICLE

(75) Inventors: Peter Weiberle, Sachsenheim (DE); Peter Sprafke, Stuttgart (DE); Martin Gerhaeusser, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 685 days.

(21) Appl. No.: 11/597,874

(22) PCT Filed: Apr. 8, 2005

(86) PCT No.: PCT/EP2005/051563
§ 371 (c)(1),
(2), (4) Date: Nov. 22, 2006

(87) PCT Pub. No.: WO2005/114006
PCT Pub. Date: Dec. 1, 2005

(65) Prior Publication Data
US 2009/0235727 A1    Sep. 24, 2009

(30) Foreign Application Priority Data
May 21, 2004  (DE) .......................... 10 2004 024 954

(51) Int. Cl.
*G01B 7/30*    (2006.01)
(52) U.S. Cl. .................................................. 73/115.02
(58) Field of Classification Search ............... 73/115.02
See application file for complete search history.

(56) References Cited

U.S. PATENT DOCUMENTS

| | | | | |
|---|---|---|---|---|
| 3,919,703 | A * | 11/1975 | Stevens | 340/870.09 |
| 4,987,792 | A * | 1/1991 | Mueller et al. | 74/473.12 |
| 5,861,803 | A * | 1/1999 | Issa | 340/456 |
| 6,002,338 | A * | 12/1999 | Pavlov et al. | 340/635 |
| 6,205,874 | B1 | 3/2001 | Kupper et al. | |
| 6,316,936 | B1 * | 11/2001 | Striker et al. | 324/207.21 |
| 6,374,941 | B1 * | 4/2002 | Forborgen | 180/444 |
| 6,550,351 | B1 * | 4/2003 | O'Reilly et al. | 74/335 |
| 6,984,191 | B2 * | 1/2006 | Kuwata et al. | 477/97 |
| 7,208,939 | B2 * | 4/2007 | Frederick et al. | 324/207.25 |
| 7,393,307 | B2 * | 7/2008 | Hozuki | 477/121 |
| 7,441,474 | B2 * | 10/2008 | Kliemannel et al. | 74/335 |
| 7,443,308 | B2 * | 10/2008 | Fox et al. | 340/649 |
| 7,552,659 | B2 * | 6/2009 | Komatsu et al. | 74/335 |
| 7,568,402 | B2 * | 8/2009 | Robinette et al. | 74/335 |
| 7,701,203 | B2 * | 4/2010 | Fouts et al. | 324/207.2 |
| 2001/0004213 | A1 * | 6/2001 | Kubota et al. | 324/528 |
| 2004/0196026 | A1 * | 10/2004 | Bolz | 324/207.12 |

FOREIGN PATENT DOCUMENTS

| | | |
|---|---|---|
| DE | 102 27 633 | 1/2004 |
| EP | 0 902 254 | 3/1999 |
| EP | 1 065 135 | 1/2001 |
| GB | 2 255 410 | 11/1992 |
| JP | 11-223639 | 8/1999 |
| JP | 2001165944 | 6/2001 |
| JP | 2001208812 | 8/2001 |
| JP | 2002048230 | 2/2002 |
| JP | 2002357456 | 12/2002 |

* cited by examiner

*Primary Examiner* — Freddie Kirkland, III
(74) *Attorney, Agent, or Firm* — Kenyon & Kenyon LLP

(57) ABSTRACT

A sensor for a transmission-shift control of a motor vehicle is described. The sensor is connectable to a supply voltage ($V_s$) and to ground (GND). The sensor generates a signal voltage ($V_{out}$). The signal voltage ($V_{out}$) may assume two signals (high, low), both signals (high, low) being different from the supply voltage ($V_s$) and from ground (GND).

5 Claims, 2 Drawing Sheets

SENSOR FOR A TRANSMISSION-SHIFT CONTROL, IN PARTICULAR OF A MOTOR VEHICLE

FIELD OF THE INVENTION

The invention relates to a sensor for a transmission-shift control of a motor vehicle, the sensor being connectable to a power supply and to ground, and the sensor generating a signal voltage.

DESCRIPTION OF RELATED ART

To control transmissions, in particular of motor vehicles, the transmission position must be determined. A position switch is provided for this purpose, for example, such as known from DE 102 27 633. The sensors used there may be, for example, mechanical switches for generating the binary codes elucidated in DE 102 27 633. Electromagnetic Hall sensors may also be provided, which have the advantage, among others, of contactless operation.

Regardless of the type of sensors used, a plurality of sensor faults may be detected according to DE 102 27 633 via a suitable selection of advantageous binary codes. This is achieved due to the fact that permissible binary codes are provided for the different transmission positions, as well as inadmissible binary codes whose occurrence indicates a fault in the position switch.

However, if a low-resistance short-circuit of the output line of one of the sensors to ground occurs, for example, this is detected in DE 102 27 633 as a low signal, i.e., as a binary "0." If a permissible binary code is obtained with this erroneously detected low signal, the fault is not detected and an erroneous transmission position is determined as a result.

SUMMARY OF THE INVENTION

It is an object of the invention to provide a sensor for a transmission-shift control, in particular of a motor vehicle, in which even low-resistance short-circuits to ground, for example, are recognizable.

These and other objects of the invention are achieved in that the signal voltage may assume two signals, both signals being different from the supply voltage and from ground.

If, for example, a low-resistance output line to ground short-circuit occurs in the sensor according to the present invention, as a result, the signal voltage may no longer assume the two provided signals which are different from ground. Instead, the signal voltage is drawn to ground due to the short-circuit. This deviation of the signal voltage from its two signals provided per se may be recognized by the downstream transmission-shift control as a fault.

BRIEF DESCRIPTION OF THE DRAWINGS

The invention will be described in greater detail with reference to the following drawings wherein.

DETAILED DESCRIPTION OF THE INVENTION

Figure 1:
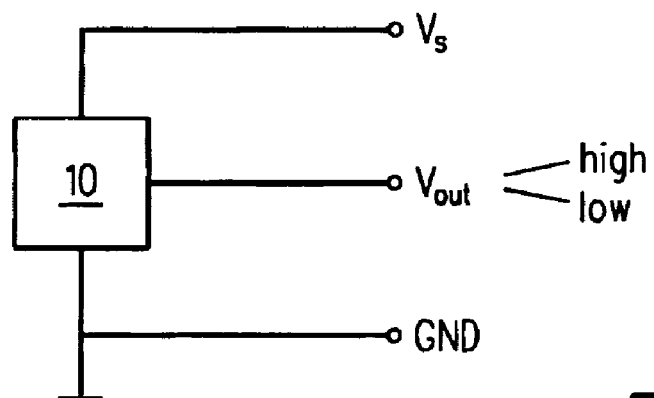
FIG. 1 shows a schematic block diagram of an exemplary embodiment of a sensor according to the present invention for a transmission-shift control, of a motor vehicle.

In an advantageous embodiment of the present invention, the two signals are configured as pulse-width-modulated signals. This ensures that the two signals may be reliably distinguished from the supply voltage and from ground. A sensor output line to ground or to supply voltage short-circuit may thus be reliably recognized as a fault.

In an advantageous refinement of the present invention, the difference between the ON state and OFF state of the two signals does not drop below a minimum switching level. It is thereby achieved that even in the event of a low supply voltage, a reliable distinction may be made between the ON state and the OFF state and the functionality of the sensor is thus ensured.

In another advantageous embodiment of the present invention, the two signals are defined via predefined voltage ranges. This again ensures that the two signals may be reliably distinguished from the supply voltage and from ground. A sensor output line to ground or to supply voltage short-circuit may thus be reliably recognized as a fault.

It is advantageous in particular if the voltage ranges of the two signals are defined via predefined limits; one or more of the limits may be dependent on the supply voltage. This allows flexible, yet simple definition of the voltage ranges.

Further features, possible applications, and advantages of the present invention are derived from the description of exemplary embodiments of the present invention that follows and are illustrated in the figures of the drawing. All features described or illustrated by themselves or in any desired combination represent the object of the present invention, regardless of their combination in the patent claims or their back-references, and regardless of their wording in the description or illustration in the drawing.

FIG. 1 shows a sensor 10 which may be used for a transmission-shift control of a motor vehicle. Sensor 10 may be a mechanical, electromagnetic, capacitive sensor, or a sensor based on other measurement principles. Sensor 10 receives a supply voltage Vs and is connected to ground GND. In the case of a motor vehicle, supply voltage Vs may assume a value between approximately 3 V and approximately 12 V, for example; a voltage of 0 V corresponds to ground GND. Sensor 10 delivers a signal voltage Vout as an output signal. Signal voltage Vout may be supplied to the above-mentioned transmission-shift control and used there for determining the transmission position.

Sensor 10 is provided for detecting two states. Signal voltage Vout may therefore also have two states, namely the "high" or "low" signal.

Sensor 10 is furthermore designed to distinguish the two possible signals "high" and "low" of signal voltage Vout from supply voltage Vs and ground GND.

Figure 2:
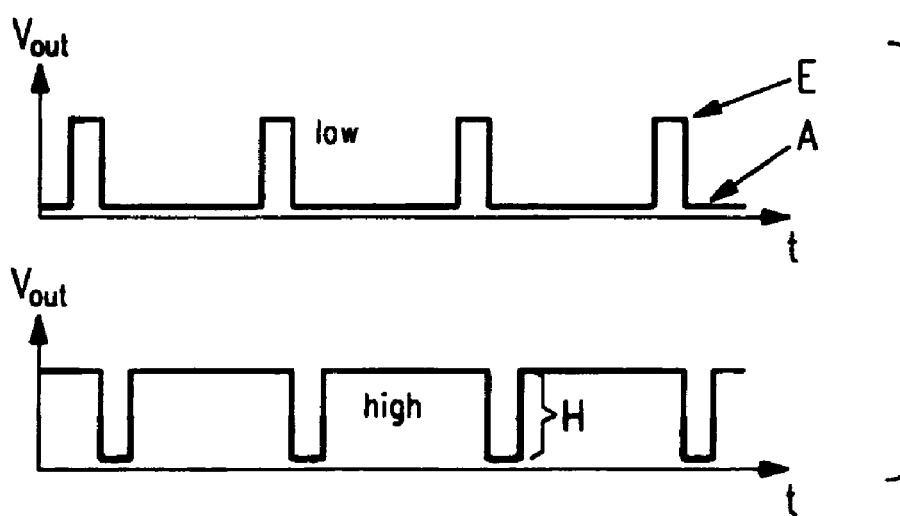
FIG. 2 shows a schematic time diagram of output signals of a first exemplary embodiment of the sensor of FIG. 1.

FIG. 2 shows the two possible signals "high" and "low" of signal voltage Vout for a first exemplary embodiment of sensor 10. The two signals "high" and "low" are configured as pulse-width-modulated signals. In FIG. 2, the low signal has an ON/OFF ratio of 20/80, for example, while the high signal has an ON/OFF ratio of 80/20.

The two signals "high" and "low" are generated by sensor 10 with the aid of an appropriate electric circuit as a function of the switching position of sensor 10.

If the signal voltage during the operation of sensor 10 has an ON/OFF ratio of approximately 20/80, this corresponds to the low signal. If the signal voltage has an ON/OFF ratio of approximately 80/20, this corresponds to the high signal. Other ON/OFF ratios indicate a fault of sensor 10.

Of course, these ON/OFF ratios may also be selected differently. For an ON/OFF ratio of 99/1 and 1/99, the consecutive short positive or negative pulse[s] may be used for diagnostic purposes. If such pulses occur on an ongoing basis, at least there is no fault; if the pulses do not occur, a fault of sensor 10 may be inferred.

The two possible signals "high" and "low" of signal voltage Vout, shown in FIG. 2, differ from supply voltage Vs and ground GND by their ON/OFF ratios. If the output line of sensor 10 has a short-circuit to ground GND or to supply voltage Vs, signal voltage Vout corresponds to neither the high signal nor the low signal. The short-circuit of sensor 10 may then be recognized as a fault.

The transmission-shift control of a motor vehicle must ensure that the vehicle may be started only when the transmission is in a parking position P or a neutral position N. As is known, these transmission positions may be determined with the aid of a plurality of sensors 10. At a low outside temperature, supply voltage Vs delivered by a motor vehicle battery may be very low and even drop to 3 V in particular. However, the two signals "high" and "low" must still be distinguishable from one another even in the case of such a low supply voltage Vs. For this purpose, the ON and OFF states of the two signals "high" and "low" must be distinguishable from one another even at low supply voltages Vs.

FIG. 2 shows no values of ON state E and OFF state A of the two signals "high" and "low." Since the two signals "high" and "low" differ from supply voltage Vs and ground GND by their pulse-width-modulated design, ON state E may correspond to supply voltage Vs and OFF state A to ground GND. It is essential that the difference between ON state E and OFF state A, i.e., switching level H, does not drop below a minimum value even in the case of a low supply voltage Vs. This minimum value may be 1.0 V, for example. This ensures that parking position P or neutral position N of the transmission is always recognized, as explained above.

Figure 3A:
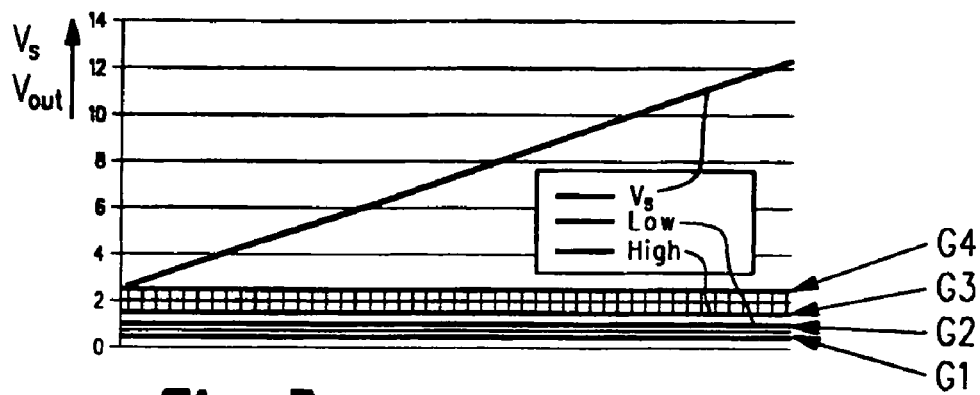
FIGS. 3a through 3c show schematic diagrams of output signals of further exemplary embodiments of the sensor of FIG. 1.
Figure 3B:
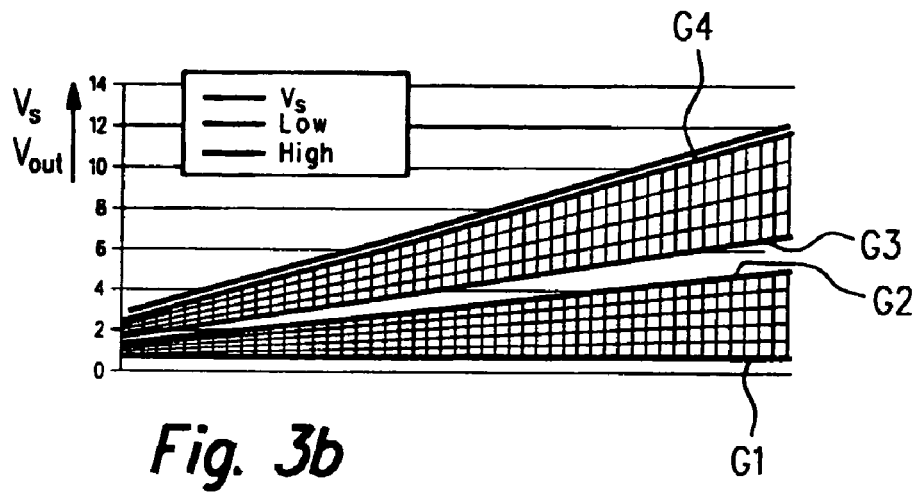
Figure 3C:
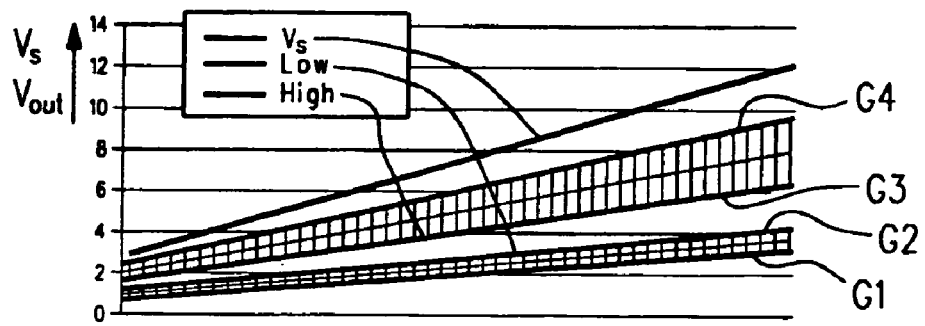

FIGS. 3a through 3c show the two possible signals "high" and "low" of signal voltage Vout for additional exemplary embodiments of sensor 10. The two signals "high" and "low" are defined via predefined voltage ranges.

In FIG. 3a, the voltage range for the low signal is defined by the limits G1=0.5 V and G2=1.0 V, and the voltage range for the high signal is defined by the limits G3=1.5 V and G4=2.5 V. These limits G1, G2, G3, G4 are independent from supply voltage Vs. A similar reasoning applies also to the given voltage ranges of the two signals "high" and "low."

If signal voltage Vout during the operation of sensor 10 is within one of the two voltage ranges, it corresponds to the particular "high" or "low" signal. If signal voltage Vout is outside both voltage ranges, there is a fault.

In FIG. 3b, the voltage range for the low signal is defined by the limits G1=0.5 V and G2=0.5×Vs−0.5 V, and the voltage range for the high signal is defined by the limits G3=0.5×Vs+0.5 V and G4=Vs−0.5 V. The limits G2, G3, G4 are dependent on supply voltage Vs. A similar reasoning applies also to the given voltage ranges of the two signals "high" and "low." Of course, the values for calculating the limits G1, G2, G3, G4 may also be selected otherwise.

If signal voltage Vout during the operation of sensor 10 is within one of the two voltage ranges defined above, it corresponds to the particular "high" or "low" signal. If signal voltage Vout is outside both voltage ranges, there is a fault.

In FIG. 3c, the voltage range for the low signal is defined by the limits G1=0.2×Vs and G2=0.4×Vs, and the voltage range for the high signal is defined by the limits G3=0.5×Vs and G4=0.85×Vs. The limits G1, G2, G3, G4 are dependent on supply voltage Vs. A similar reasoning applies also to the given voltage ranges of the two signals "high" and "low." Of course, the given values for calculating the limits G1, G2, G3, G4 may also be selected otherwise.

If signal voltage Vout is within one of the two voltage ranges defined above, it corresponds to the particular "high" or "low" signal. If signal voltage Vout is outside both voltage ranges, there is a fault.

All possible signals "high" and "low" of signal voltage Vout, shown in FIGS. 3a through 3c, differ from supply voltage Vs and ground GND by their predefined limits. If the output line of sensor 10 exhibits a short-circuit to ground GND or to supply voltage Vs, signal voltage Vout corresponds to neither the high signal nor the low signal. The short-circuit of sensor 10 may then be recognized as a fault.

What is claimed is:

1. A sensor for a transmission-shift control, the sensor being connectable to a supply voltage and to ground, and the sensor being configured to generate a signal voltage, the signal voltage including one of a high signal and a low signal, each of the high signal and the low signal being different from the supply voltage and from ground,
wherein the sensor is configured to define a voltage range for the high signal and a voltage range for the low signal, the voltage ranges of the high signals and the low signals being defined by an upper limit and a lower limit, respectively,
wherein the sensor is configured to recognize the signal voltage as the high signal if it is between the limits of the voltage range for the high signal, and to recognize the signal voltage as the low signal if it is between the limits of the voltage range for the low signal,
wherein one or more of the limits are dependent on and a function of the supply voltage, and
wherein an alteration of the supply voltage causes an alteration of one or more of the limits.

2. A position switch of a transmission-shift control of a motor vehicle, comprising the sensor according to claim 1.

3. The sensor according to claim 1, wherein the supply voltage is between approximately 3V and approximately 12V.

4. The sensor according to claim 1, wherein a deviation of the signal voltage from the high or low signals is recognizable as a fault.

5. The sensor according to claim 1, wherein one or more of the limits are a linear function of the supply voltage.

* * * * *